(12) United States Patent
Anton et al.

(10) Patent No.: US 7,350,629 B2
(45) Date of Patent: Apr. 1, 2008

(54) FLOATING DAMPER

(75) Inventors: Jamison J. Anton, Beecher, IL (US);
Steven L. Bivens, Kankakee, IL (US);
David A. Doornbos, Manteno, IL (US)

(73) Assignee: Illinois Tool Works Inc., Glenview, IL (US)

( * ) Notice: Subject to any disclaimer, the term of this patent is extended or adjusted under 35 U.S.C. 154(b) by 287 days.

(21) Appl. No.: 11/197,032

(22) Filed: Aug. 4, 2005

(65) Prior Publication Data

US 2006/0102439 A1 May 18, 2006

Related U.S. Application Data

(60) Provisional application No. 60/629,044, filed on Nov. 18, 2004.

(51) Int. Cl.
*F16D 63/00* (2006.01)
(52) U.S. Cl. ..................................... 188/82.1
(58) Field of Classification Search ............... 188/82.1, 188/82.2, 83, 130, 290, 293, 294, 295, 296; 74/89.18, 411.5; 16/352, 357
See application file for complete search history.

(56) References Cited

U.S. PATENT DOCUMENTS

| | | | |
|---|---|---|---|
| 5,658,058 A | 8/1997 | Bivens et al. | |
| 5,829,851 A | 11/1998 | Bivens et al. | |
| 5,887,930 A | 3/1999 | Klein | |
| 6,131,242 A * | 10/2000 | Zipperle et al. | 188/82.1 |
| 6,848,759 B2 * | 2/2005 | Doornbos et al. | 188/82.1 |
| 6,910,557 B2 * | 6/2005 | Doornbos et al. | 188/290 |
| 7,044,529 B2 * | 5/2006 | Svenson et al. | 296/37.12 |
| 7,065,829 B2 * | 6/2006 | Okabayashi et al. | 296/37.12 |
| 2002/0170143 A1 | 11/2002 | Vitry | |
| 2005/0023089 A1 | 2/2005 | Okabayashi et al. | |

FOREIGN PATENT DOCUMENTS

| | | |
|---|---|---|
| DE | 19505985 | 8/1996 |
| EP | 1503111 | 2/2005 |
| WO | WO 2005066523 | 7/2005 |

* cited by examiner

*Primary Examiner*—Thomas J Williams
(74) *Attorney, Agent, or Firm*—Mark W. Croll; Paul F. Donovan

(57) ABSTRACT

A floating damper assembly operates between first and second associated components. A damper is adjustably mounted in the first component and includes a damper gear engaged with a gear on the second component. The second component defines a guide surface and the damper has a bearing surface engaging the guide surface.

10 Claims, 3 Drawing Sheets

FLOATING DAMPER

CROSS-REFERENCE TO RELATED APPLICATIONS

The present regular United States Patent Application claims the benefits of United States Provisional Patent Application Ser. No. 60/629,044 filed Nov. 18, 2004.

FIELD OF THE INVENTION

The present invention relates generally to movement damper devices and, more particularly, to small gear dampers using damping media or fluid as the damping means.

BACKGROUND OF THE INVENTION

Small dampers have many applications and uses for controlling the movement of things. Dampers are found often in automotive applications such as, for example, glove boxes doors, cup holders, assist handles and the like. Dampers are used to control the natural gravitational movement of such components and to provide a desired "feel" to movement of the component. Uses for dampers in assemblies other than automobiles are also known, such as, for example and not by way of limitation, furniture, appliances, electronic equipment and other assemblies with movable components.

A known damper design that has been used with frequency provides resistance to the movement of a gear on the component to be controlled through driving engagement between the gear of the component and a gear of the damper. The damper gear is on a rotor, and resistance to rotation of the rotor and damper gear is inherent in the structure of the damper. Resistance to rotation of the damper gear is imparted to the movement of the gear on the component through driving engagement of the damper gear and the gear on the component. Movement of the component is thereby controlled. Such damping devices frequently are referred to as gear dampers.

A gear damper of the type described is known to include a rotor rotatably held in a housing. An external gear is mounted on a shaft of the rotor projecting outwardly from the housing. Resistance to a rotation of the rotor is provided in part by a viscous fluid contained in a chamber within the housing, through which viscous fluid the rotor must spin.

A problem with the use of gear dampers of this type is that unless the mating gears are manufactured within a tight range of tolerances, the gears can either be placed too far apart so as not to engage with each other properly or too close together such that the gears have a tendency to bind. Floating dampers have been used to address these problems in some applications. However, in other applications for gear dampers, simply providing a floating damper does not adequately meet the needs. Depending on the application, maintaining engagement of the gears is not insured by simply providing a damper that floats. Further, build variations and tolerances inherent in automotive and other devices cause gear teeth to skew relative to each other and lose engagement or bind. Prolonged use and wear can cause further shifting of associated components, exacerbating the problem.

SUMMARY OF THE INVENTION

The present invention provides a floating damper that includes a bearing surface or guide member adapted to ride in a mating slot of an associated component. The bearing surface and slot ensure properly aligned engagement between gears of the damper and of the associated component.

In one form thereof, the present invention provides a damper assembly for first and second associated components movable relative to each other. A gear damper housing is mounted adjustably on the first component. A rotor shaft projects outwardly from the housing, and a damper gear is drivingly disposed on the rotor shaft. A bearing surface of the damper is in fixed location relative to the damper gear. A second gear is disposed on the second component and is engaged with the damper gear. A guide surface of the second component is disposed in a fixed position with respect to the second gear. The guide surface engages the bearing surface of the damper.

In another form thereof, the present invention provides a damper assembly for first and second components movable relative to each other. A damper is adjustably attached to the first component. A rotatable shaft extends outwardly of the damper. A first gear is disposed on the shaft for rotation therewith. A second gear is attached to the second component. A channel is defined in the second component. The first and second gears are drivingly engaged with each other. A distal end outwardly of the first gear is disposed in the channel.

In a still further form thereof, the present invention provides a gear damper assembly with a gear damper having a first gear and a bearing surface in fixed position relative to the first gear; a second gear engaged with the first gear, a guide surface provided in fixed position relative to the second gear; and the bearing surface engaging the guide surface.

An advantage of the present invention is providing a gear damper that floats to minimize drift and control spacing between a gear of the damper and a gear of an associated component.

Another advantage of the present invention is providing a gear damper that maintains proper alignment and engagement between a gear of the damper and a gear of an associated component.

Still another advantage of the present invention is providing a gear damper assembly that compensates for tolerance stack-up and build variations in the damper and a structure on which the damper operates.

Other features and advantages of the invention will become apparent to those skilled in the art upon review of the following detailed description, claims and drawings in which like numerals are used to designate like features.

Figure 1:
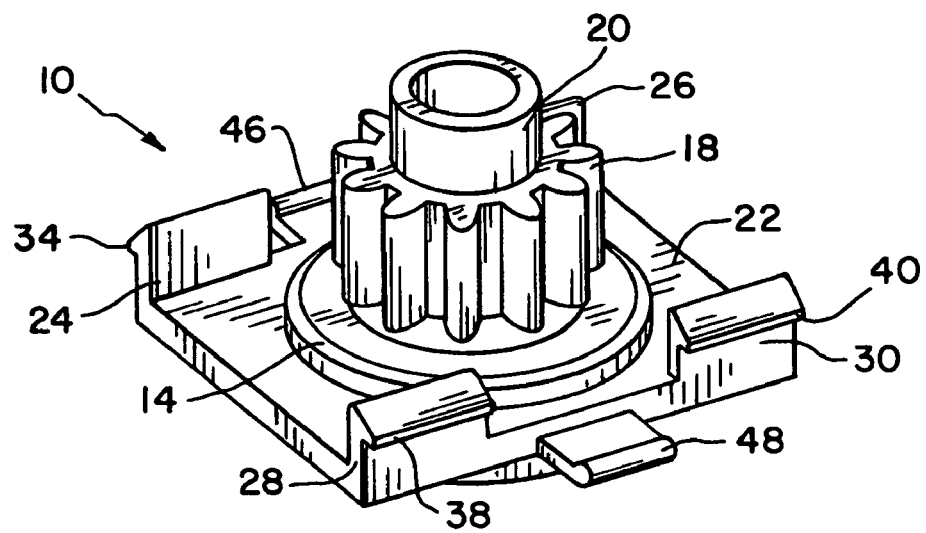
FIG. 1 is a perspective view of a gear damper in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
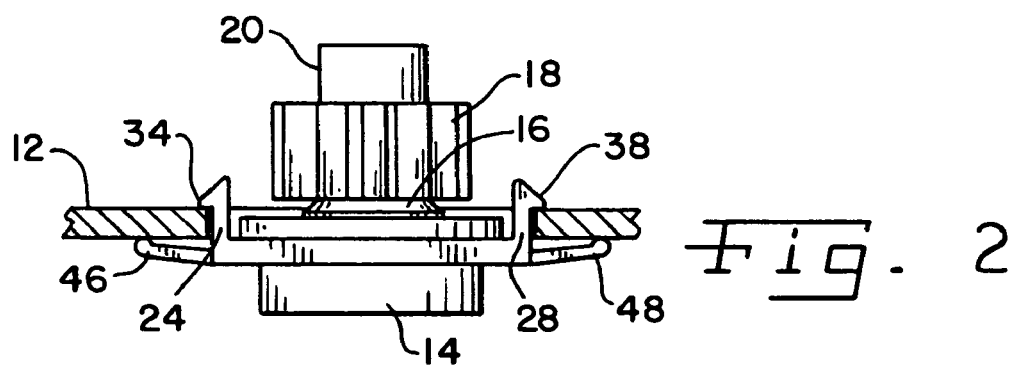
FIG. 2 is a vertical view of the damper shown in FIG. 1 illustrated installed in a mounting plate or component of a device, which is shown in cross-section.

Referring now more specifically to the drawings and to FIG. 1 in particular, numeral 10 designates a damper of the present invention which can be used for mounting in a first component 12 of a device (FIG. 2) which may be a door, framework or panels of a glove box or accessory compartment; a cup holder or the like in an automobile; or drawers, doors, devices and things in other apparatuses and structures such as furniture, appliances, electronic components and the like. It is anticipated that damper 10 of the present invention will have a wide range of uses and applications, and should not be interpreted as being limited to the few applications and uses provided as examples herein.

Damper 10 includes a housing 14 and a rotor rotatably disposed therein. The rotor includes a shaft 16 that extends outwardly from housing 14. A gear 18 is drivingly connected to shaft 16 for rotation with shaft 16. A distal end defines a bearing surface 20 outwardly of damper gear 18. Shaft 16, damper gear 18 and bearing surface 20 can be formed as a single monolithic body. Alternatively, shaft 16 and gear 18 can be separate bodies subsequently connected, with bearing surface 20 being an outer end of shaft 16 extending through damper gear 18, or bearing surface 20 can an outer portion of damper gear 18.

Housing 14 is a sealed structure and contains a damping fluid therein. The internal configuration of housing 14 and the portions of the rotor disposed therein are such as to provide controlled resistance to the rotation of rotor shaft 16 in at least one direction. The basic structures, functions and arrangements of gear dampers are well-known to those skilled in the art and will not be described in further detail herein.

Damper housing 14 is affixed to a mounting base 22 by which damper 10 is secured to component 12. Housing 14 and base 22 can be formed of plastic as a monolithic body in a plastic molding process, for example. Housing 14 and base 22 also can be separately formed and attached to each other by welding, for example. Four snap-fit features 24, 26, 28 and 30 are provided on base 22 to secure damper 10 within an opening 32 in component 12. Snap-fit features 24, 26, 28 and 30 are substantially perpendicular to base 22 at the corners thereof, in the exemplary embodiment. It should be understood that fewer then four or more than four snap-fit features can be used, and can be located other than at the corners of base 22. Other locking structures consistent with the purposes to be described herein also can be used.

Figure 3:
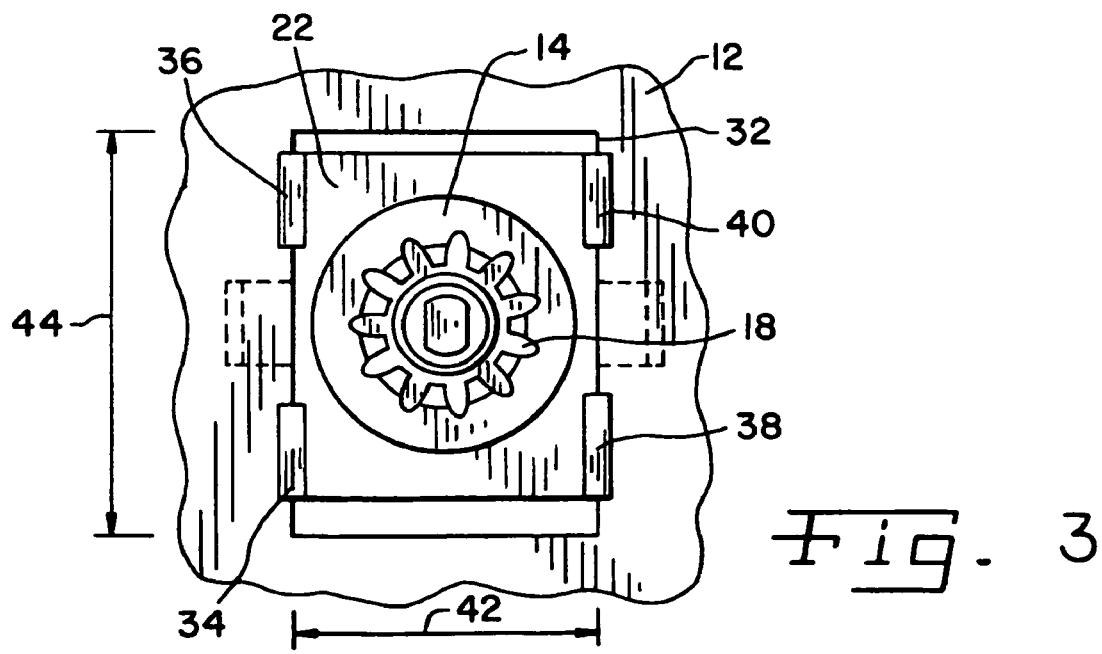
FIG. 3 is a plan view of the installed damper shown in FIG. 2.

Snap-fit features 24, 26, 28 and 30 have outwardly directed, tapered tabs 34, 36, 38 and 40, respectively, at the distal ends thereof. Two tabs 34, 36 on one side of base 22 extend in a same direction, and the remaining two tabs 38, 40 on an opposite side of base 22 extend in a same direction that is opposite to that of the first mention two tabs 34, 36. Opening 32 has a width indicated by line 42 of sufficient dimension to receive base 22 and proximal portions of snap-fit features 24, 26, 28 and 30. Width 22 is less than the full width between pairs of tabs 34, 36 and 38, 40 on opposite sides of base 22. The tapered distal faces of tabs 34, 36, 38 and 40 cause inward deflection of features 24, 26, 28 and 30 as the features are pushed through opening 32. As tabs 34, 36, 38 and 40 are pushed completely through opening 32, features 24, 26, 28 and 30 rebound outward, with tabs 34, 36, 38 and 40 extending over a surface of component 12 as shown in FIG. 3, thereby inhibiting withdrawal of damper 10 from opening 32.

Opening 32 has a length indicated by the line designated with number 44. Length 44 is greater than the length of base 22, thereby allowing back and forth movement of base 22 relative to component 12. Spring arms 46, 48 are provided on opposite sides of base 22 and are compressed against component 12 when base 22 is secured to component 12 via snap-fit features 24, 26, 28 and 30. Spring arms 46, 48 provide a biasing force to prevent objectionable rattle or noise from the fit of base 22 against component 12, while still allowing for relative float between damper 10 and component 12 back and forth along length 44.

Figure 4:
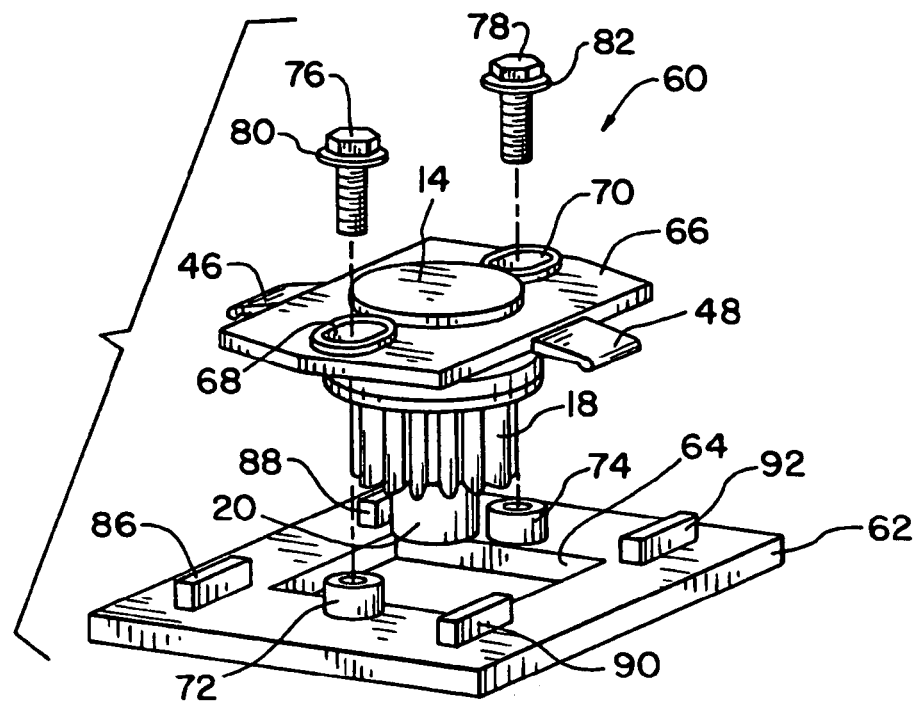
FIG. 4 is an exploded view of an alternate form of a damper in accordance with the present invention.
Figure 5:
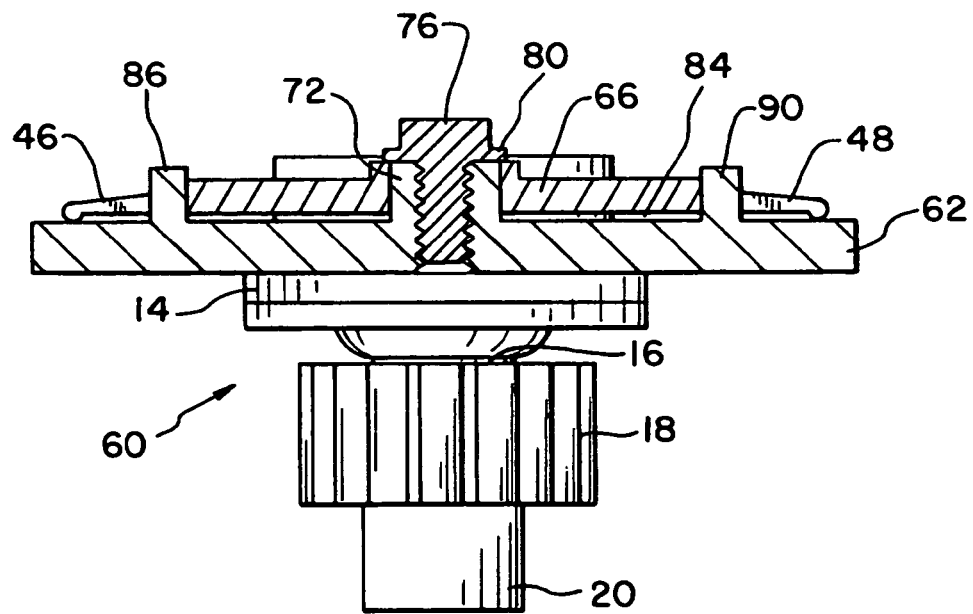
FIG. 5 is a cross-sectional view of the completed damper assembly shown in FIG. 4.
Figure 6:
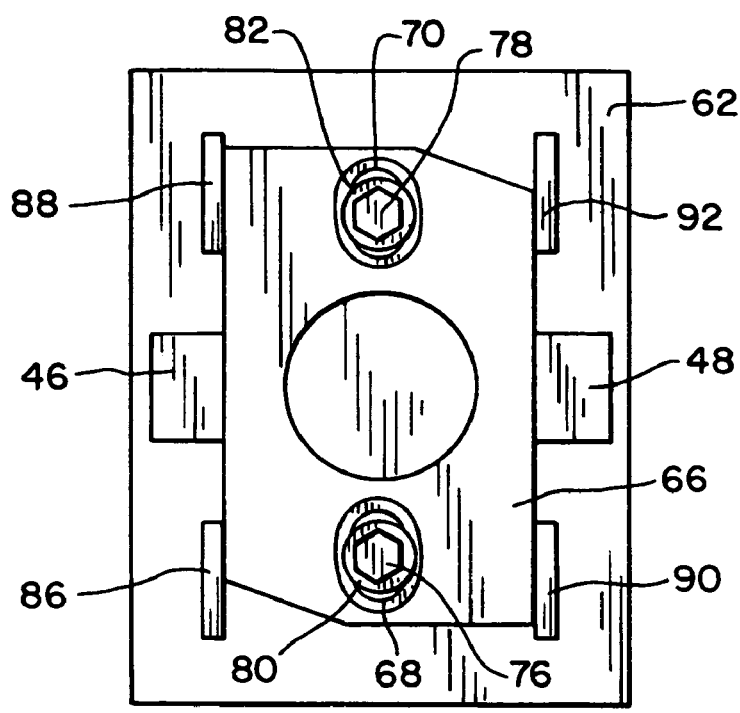
FIG. 6 is a plan view of the damper shown in FIGS. 4 and 5.

Snap-fit attachment of damper 10 to device 14 can speed assembly for many uses of damper 10. However, in some uses of the present invention it may be desirable to use removable fasteners. FIGS. 4-6 illustrate another configuration of a damper 60 in accordance with the present invention that can be secured to a component 62 through an opening 64. Damper 60 includes a number of structures similar to damper 10, including housing 14, shaft 16, damper gear 18, bearing surface 20 and spring arms 46, 48, all as described previously herein, and all of which are similarly numbered in FIG. 4-6 and in FIGS. 1-3.

Damper housing 14 of damper 60 is affixed to a base 66 having elongated slots 68 and 70 therein. Screw bosses 72 and 74 are configured and arranged on component 62 to be received in slots 68 and 70. Fasteners 76 and 78 having collars 80 and 82, respectively, are inserted through slots 68 and 70 and are received in screw bosses 72 and 74. Collars 80 and 82 are sufficiently large to prevent pull-through in slots 68 and 70. Thus, when secured in screw bosses 72, 74 fasteners 76 and 78 hold base 66 relative to component 62. However, because of the elongated configuration of slots 68 and 70, base 66 can move slightly with respect to component 62, thereby permitting float of damper 60 in at least one line back and forth.

Spring arms 46, 48 on opposite sides of base 66 and are compressed against component 62 when base 66 is secured via fasteners 76, 78 in screw bosses 72 and 74. Fasteners 76, 78 and specifically collars 80, 82 thereof tighten against screw bosses 72, 74 without base 66 being compressed tightly against component 62. A space 84 remains between base 66 and component 62. Spring arms 46, 48 provide a biasing force to prevent objectionable rattle or noise from base 66 against component 62.

Guide blocks 86, 88, 90 and 92 are provided on component 62 to position and restrict damper 60. FIG. 6 shows in plan view the positioning of base 66 between guide blocks 86, 88, 90 and 92, as well as the orientation of fasteners 76 and 78 within slots 68, 70. FIG. 5 shows the mounting in cross-section, through guide blocks 86 and 90 as well as screw boss 70 and fastener 76 disposed therein.

Figure 7:
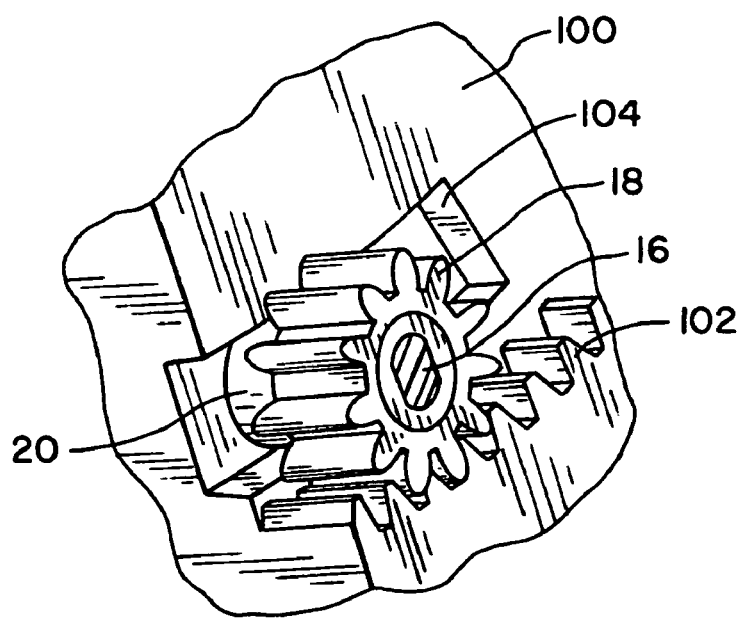
FIG. 7 is a fragmentary view of a damper of the present invention installed in the associated components.

Dampers 10, 60 of the present invention are configured and arranged in components 12, 62, respectively to operate with and control movement relative to a second associated component 100, as shown in FIG. 7. Associated component 100 includes a gear 102 configured for engagement with gear 18. Gear 102 can be of various different types and configurations, and in the exemplary embodiment gear 102 is a straight gear or rack gear engaging damper gear 18. It should be understood that second gear 102 also can be various other types of gears, including generally circular type gears. Associated component 100 further defines a guide surface in the form of a channel 104. The distal end of rotor shaft 16 defining bearing surface 20 outwardly of gear 18 is received in channel 104.

Bearing surface 20 of shaft 16 is provided in a fixed position relative to damper gear 18. Guide surface or channel 104 is provided in a fixed position relative to second gear 102. The interaction of bearing surface 20 and guide surface 104 ensures fixed relative positioning of damper gear 18 relative to second gear 102, thereby facilitating proper alignment and engagement of the gears. The adjustable, floating attachment of dampers 10, 60 to components 12, 62 further facilitates alignment and inhibits binding of the gears. The pitch diameters of damper gear 18 and second gear 102 remain tangent even as variations occur, and the damper follows the second gear through changes in relative location between the associated components 12 or 62 and 100.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A damper assembly comprising:
   first and second associated components movable relative to each other;
   a gear damper housing adjustably mounted on the first component;
   a rotor shaft projecting outwardly from said housing;
   a damper gear drivingly disposed on said rotor shaft;
   a bearing surface of said damper in fixed location relative to said damper gear;
   a second gear disposed on said second component and drivingly engaged with said damper gear;
   a guide surface of said second component disposed in a fixed position with respect to said second gear, said guide surface engaging said bearing surface of said damper, said bearing surface being a distal end outwardly of said damper gear and said guide surface comprising a channel in said second component, with said distal end being received in said channel;
   a base connected to said housing, said base being adjustably attached to said first component, said base including spring arms engaging said first component; and
   snap-fit features disposed on said base engaging said first component.

2. The damper assembly of claim 1, said second gear being a rack gear.

3. A damper assembly comprising:
   first and second associated components movable relative to each other;
   a gear damper housing adjustably mounted on the first component;
   a rotor shaft projecting outwardly from said housing;
   a damper gear drivingly disposed on said rotor shaft;
   a bearing surface of said damper in fixed location relative to said damper gear;
   a second gear disposed on said second component and drivingly engaged with said damper gear;
   a guide surface of said second component disposed in a fixed position with respect to said second gear, said guide surface engaging said bearing surface of said damper, said bearing surface being a distal end outwardly of said damper gear and said guide surface comprising a channel in said second component, with said distal end being received in said channel;
   a base connected to said housing, said base being adjustably attached to said first component, said base including spring arms engaging said first component;
   snap-fit features disposed on said base; and
   an opening in said first component receiving said base and said snap-fit features, said opening being larger than said base in at least one direction allowing relative movement between said base and said first component.

4. A damper assembly comprising:
   first and second associated components movable relative to each other;
   a gear damper housing adjustably mounted on the first component;
   a rotor shaft projecting outwardly from said housing;
   a damper gear drivingly disposed on said rotor shaft;
   a bearing surface of said damper in fixed location relative to said damper gear;
   a second gear disposed on said second component and drivingly engaged with said damper gear;
   a guide surface of said second component disposed in a fixed position with respect to said second gear, said guide surface engaging said bearing surface of said damper, said bearing surface being a distal end outwardly of said damper gear and said guide surface comprising a channel in said second component, with said distal end being received in said channel;
   a base connected to said housing, said base being adjustably attached to said first component, said base including spring arms engaging said first component; and
   said base defining elongated slots therein, said first component defining bosses, and fasteners extending through said slots into said bosses.

5. A damper assembly comprising:
   first and second associated components movable relative to each other;
   a gear damper housing adjustably mounted on the first component;
   a rotor shaft projecting outwardly from said housing;
   a damper gear drivingly disposed on said rotor shaft;
   a bearing surface of said damper in fixed location relative to said damper gear;
   a second gear disposed on said second component and drivingly engaged with said damper gear;
   a guide surface of said second component disposed in a fixed position with respect to said second gear, said guide surface engaging said bearing surface of said damper; and a base connected to said housing, and snap-fit features disposed on said base and attaching said base to said first component, said base including spring arms engaging said first component.

6. The damper assembly of claim 5, including an opening in said first component receiving said base and said snap-fit features, said opening being larger than said base in at least one direction allowing relative movement between said base and said first component.

7. The damper assembly of claim 5, said bearing surface being a distal end outwardly of said damper gear.

8. The damper assembly of claim 5, said guide surface being a channel in said second component.

9. A damper assembly comprising:
    first and second components movable relative to each other;
    a damper adjustably attached to said first component;
    a rotatable shaft extending outwardly of said damper;
    a first gear disposed on said shaft for rotation therewith;
    a second gear attached to said second component;
    a channel defined in said second component;
    said first and second gears being drivingly engaged with each other; and
    a distal end outwardly of said first gear being disposed in said channel;
    said first component defining an opening and said damper being slidably secured in said opening; and
    said damper including a base having elongated slots therein, said first component defining fastener bosses aligned with said slots and fasteners extending through said slots into said bosses.

10. The damper assembly of claim 9, said damper including snap-fit features engaging said opening.

* * * * *